No. 853,210. PATENTED MAY 14, 1907.
C. O. ANDERSON.
SLACK ADJUSTER.
APPLICATION FILED JUNE 11, 1906.
2 SHEETS—SHEET 1.
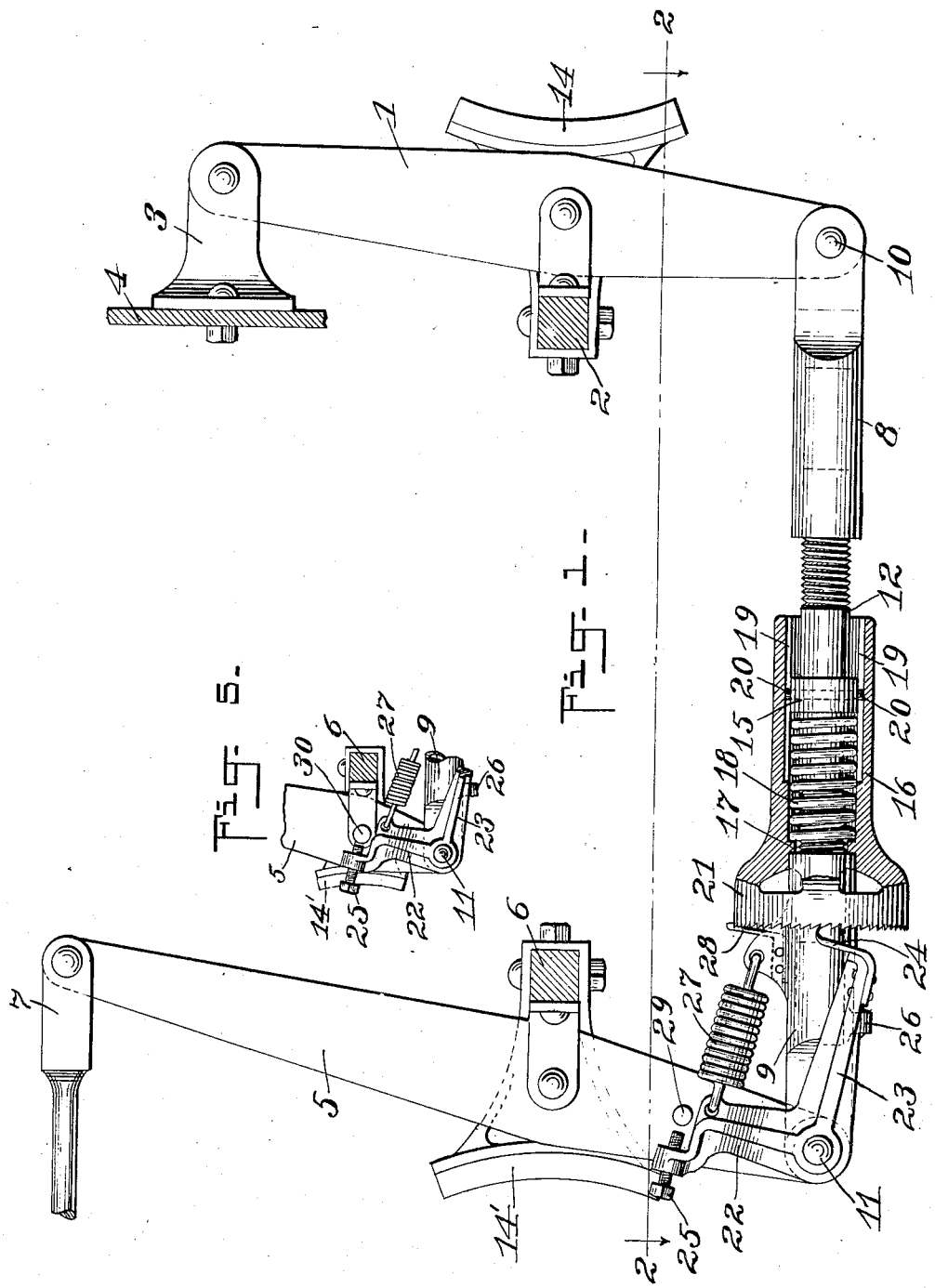
Witnesses:—
Charles J. Cobb
O. A. Gardiner
Inventor:—
Charles Oscar Anderson
by Hill & Hill
Attys.

No. 853,210. PATENTED MAY 14, 1907.
C. O. ANDERSON.
SLACK ADJUSTER.
APPLICATION FILED JUNE 11, 1906.
2 SHEETS—SHEET 2.
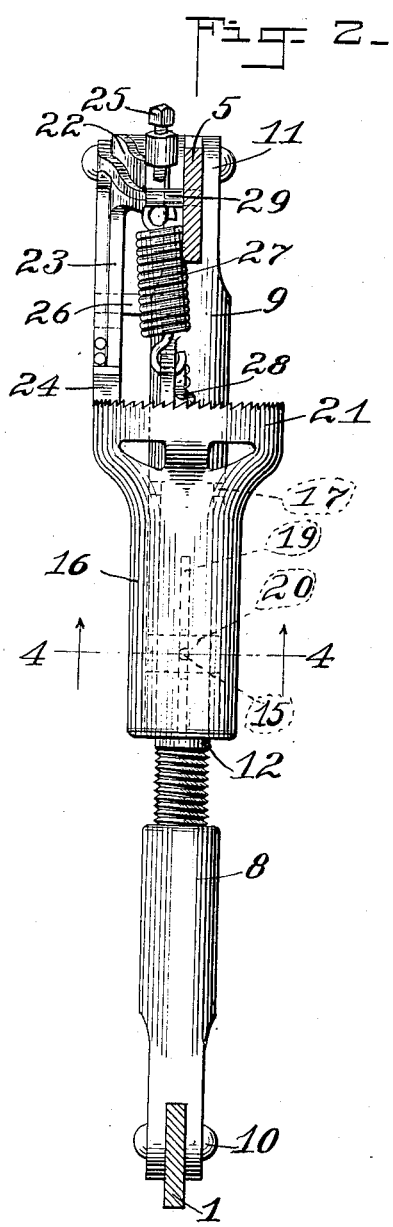
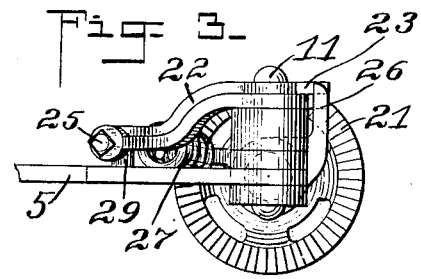
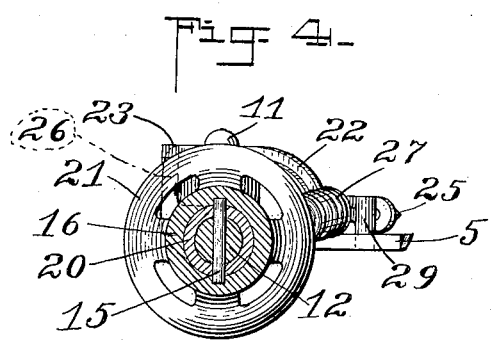
Witnesses:—
Charles I. Cobb
O. A. Gardiner
Inventor:—
Charles Oscar Anderson
by Hill & Hill
Attys.

UNITED STATES PATENT OFFICE.

CHARLES OSCAR ANDERSON, OF OMAHA, NEBRASKA, ASSIGNOR OF ONE-HALF TO A. T. AUSTIN, OF OMAHA, NEBRASKA.

SLACK-ADJUSTER.

No. 853,210.   Specification of Letters Patent.   Patented May 14, 1907.

Application filed June 11, 1906. Serial No. 321,289.

*To all whom it may concern:*

Be it known that I, CHARLES OSCAR ANDERSON, a citizen of the United States, residing at Omaha, county of Douglas, and State of Nebraska, have invented a certain new and useful Improvement in Slack-Adjusters, of which the following is a description.

My invention relates to means for automatically adjusting the brake rigging of railway cars or other vehicles to compensate for the wear upon the brake shoes or other portions of the brake mechanism.

The object of my invention is to produce a simple, durable, accurate, and reliable device of the kind described, requiring practically no attention except when necessary to renew the brake shoes.

To this end my invention consists in the novel construction, arrangement, and combination of parts herein shown and described, and more particularly pointed out in the claims.

In the accompanying drawings wherein like or similar reference characters indicate like or corresponding parts; Figure 1 is an elevation of my device shown in operative position upon a brake rigging with parts removed and broken away to more clearly show the construction. Fig. 2 is a section taken substantially on line 2—2 of Fig. 1. Fig. 3 is an end elevation of the parts as shown in Fig. 2. Fig. 4 is a section taken substantially on line 4—4 of Fig. 2; and Fig. 5 is a fragmentary elevation showing a slightly modified arrangement of the operating mechanism.

My device broadly consists in automatically adjustable means for connecting the brake shoe actuating mechanism at opposite ends of a truck and may be operated either in tension or compression as required upon the different styles of brake mechanism.

In the form of my device shown in the drawings, 1 is the dead lever as usually employed in a common form of brake rigging, pivotally connected intermediate its ends to the brake beam 2. The upper end of the lever 1 is pivotally connected by means of a suitable connection 3 to a portion of the car or truck framing 4.

The live lever 5 is suitably connected to a brake beam 6 and at its upper end is connected to the brake operating mechanism (not shown) by means of a rod or other suitable connecting means 7; and my improved slack adjuster is employed to pivotally connect the lower or free ends of the levers 1 and 5.

Any suitable form of connecting means may be employed, provided with means for attachment to the levers and in which an intermediate member may be rotated to alter its length, or the distance between the free ends of the levers.

As shown suitable sleeves 8 and 9 are pivotally attached by means of pins 10 and 11 or equivalent means to the free ends of the levers 1 and 5 respectively; the interior of the sleeves being suitably finished to engage the threaded member or screw 12 so that by rotating the member 12 the distance between the ends of the sleeves 8 and 9 may be changed as desired.

In the form shown the interior of the sleeve 8 is threaded to coöperate with left hand threads upon one end of the screw 12 and the member 9 is threaded to coöperate with the right hand threads formed upon the opposite end of the screw.

Wear upon the faces of the brake shoes 14 and 14′ attached to the beams 2 and 6 respectively or upon other portions of the brake rigging will tend to increase the movement of the rod 7 and the levers 1 and 5 when setting the brakes and it is the function of my device to gradually increase the distance between the free ends of the levers 1 and 5, in the form shown, to compensate for the wear.

Any suitable means, adapted to be operated by an increase in the movement of the lever 5, may be employed to rotate the screw 12. As shown a collar 15 is fixed upon the screw intermediate its length and a sleeve 16 is loosely mounted upon the collar 15 with one end also rotatably mounted upon the end of the sleeve 9; an annular projection 17 being provided upon the interior of the sleeve 16 to engage the sleeve 9 and prevent any movement of the same toward the lever 5 and a spring 18 extending from the collar 15 to the projection 17 to normally hold the same in contact with the end of the sleeve. Any desired number of suitable longitudinal grooves or key-ways 19—19 are provided upon the interior of the sleeve 16 and a key or other projection 20 is provided upon the collar 15 for each groove so that while the sleeve 16 may freely slide longitudinally upon the collar 15, any rotation of the sleeve will produce a similar rotation of the collar and of the screw 12.

Any suitable form of ratchet 21 may be provided attached to the sleeve 16. As shown the end of the sleeve 16 adjacent to lever 5 is enlarged and the ratchet teeth are provided upon its face, thus providing a ratchet formed integral with the sleeve.

A bell crank 22—23 is pivotally mounted near the end of the sleeve, preferably upon the pin 11 with a spring dog 24 arranged at the extremity of the arm 23 to engage the teeth of the ratchet 21, and with its arm 22 extending upward beside the lever 5 and preferably provided with an adjusting screw 25 near its extremity.

A stop 26 is formed upon the sleeve 16 in the path of the arm 23 to limit its movement in one direction, and a spring 27 is provided to normally hold the arm 23 against the stop. A pawl 28 or equivalent means is provided to engage the teeth of the ratchet 21 and normally prevent its backward rotation.

When the rod 7 is moved in the direction indicated to set the brakes, in case through wear or other cause, the movement of the lever 5 is excessive a part 29 upon the lever in the path of the arm 23 engages the screw 25 and moves the arm 23 out of its normal position, causing the dog 24 to pass over one or more teeth upon the ratchet 21 and holding the same thus until the brakes are released and the lever 5 returns to the position shown in the drawings when the spring 27 returns the arm 23 to its normal position rotating the ratchet a corresponding distance and by the rotation of the screw 12 connected to the ratchet adjusting or taking up the slack, each oscillation of the bell crank 22—23 rotating the screw 12 and adjusting the brake rigging to prevent excessive movement of the rod 7 or other parts of the mechanism.

In Fig. 5 in place of a projection 29 upon the lever 5, the parts are so proportioned that the pin 30 by which the lever 5 is pivotally connected to the brake beam 6, is positioned in the path of the screw 25, evidently however the operation of the device is substantially the same as already described, and no further explanation is believed to be necessary.

In this specification only the preferred form of my device is shown and described, and it is obvious that various slight modifications may be required to adapt my improvement to the varying conditions found in actual practice, hence I do not wish to be understood as limiting myself to the exact form and construction shown.

Having thus described my improvement, what I claim as new and desire to secure by Letters Patent is:—

1. In a slack adjuster for brake rigging, a pivoted lever, a screw connecting said lever to other parts of the brake rigging, and a sleeve mounted upon, and rotatively engaged with, said screw, in combination with a ratchet connected with said sleeve, an oscillating arm, a part near the end of said arm arranged to engage said ratchet to rotate the same, resilient means adapted to move said arm in one direction, and means upon said pivoted lever for moving said arm in the opposite direction.

2. In a slack adjuster for brake rigging, a pivoted lever, a screw connecting said lever to other parts of the brake rigging, and a sleeve mounted upon and rotatively engaged with said screw, in combination with a ratchet connected with said sleeve, an oscillating arm, a part near the end of said arm arranged to engage said ratchet to rotate the same, resilient means adapted to move said arm in the direction to rotate said ratchet, and means upon said pivoted lever for moving said arm in the opposite direction.

3. In a slack adjuster for brake rigging, a pivoted lever, a screw connecting said lever to other parts of said brake rigging, and a ratchet rotatively connected to said screw, in combination with an oscillating arm, a part near the end of said arm arranged to engage said ratchet to rotate the same in one direction, a pawl to prevent rotation of said ratchet in the opposite direction, resilient means adapted to move said arm in one direction, and means upon said pivoted lever for moving said arm in the opposite direction.

4. In a slack adjuster for brake rigging, a pivoted lever, means for connecting said lever to other parts of the brake rigging comprising two internally threaded members and a right and left hand screw connecting the same, in combination with a ratchet rotatively engaged with said screw, an oscillating arm, a part near the end of said arm arranged to engage said ratchet to rotate the same, resilient means adapted to move said arm in one direction, and means upon said pivoted lever for moving said arm in the opposite direction.

5. In a slack adjuster, two brake rigging members, and a screw engaged in the same, in combination with a sleeve slidably mounted upon said screw and engaged therewith, a ratchet connected with said sleeve, a pawl arranged to coöperate with said ratchet, resilient means arranged to normally maintain said pawl at one limit of its movement, and means actuated by a part of said brake rigging for moving said pawl out of its normal position.

6. In a slack adjuster for brake rigging, a pivoted lever, a screw connecting said lever to other parts of the brake rigging, in combination with means for operating said screw pivotally connected to, and having a part positioned in the path of, said lever and operated only by excessive movement of said lever.

7. In a slack adjuster for brake rigging, a pivoted lever, a screw connecting said lever to other parts of the brake rigging, in combination with mechanism for operating said screw having a part positioned in the path of said lever whereby excessive movement of said lever will move said operating mechanism into operative position, and resilient means for operating said mechanism.

In testimony whereof, I have hereunto signed my name in the presence of two subscribing witnesses:—

CHARLES OSCAR ANDERSON.

Witnesses:
 A. A. McCLURE,
 M. ENGLER.